Sept. 12, 1933.     A. T. LIGHT     1,926,908
TROUGH FOR MILK COOLERS
Filed June 16, 1931
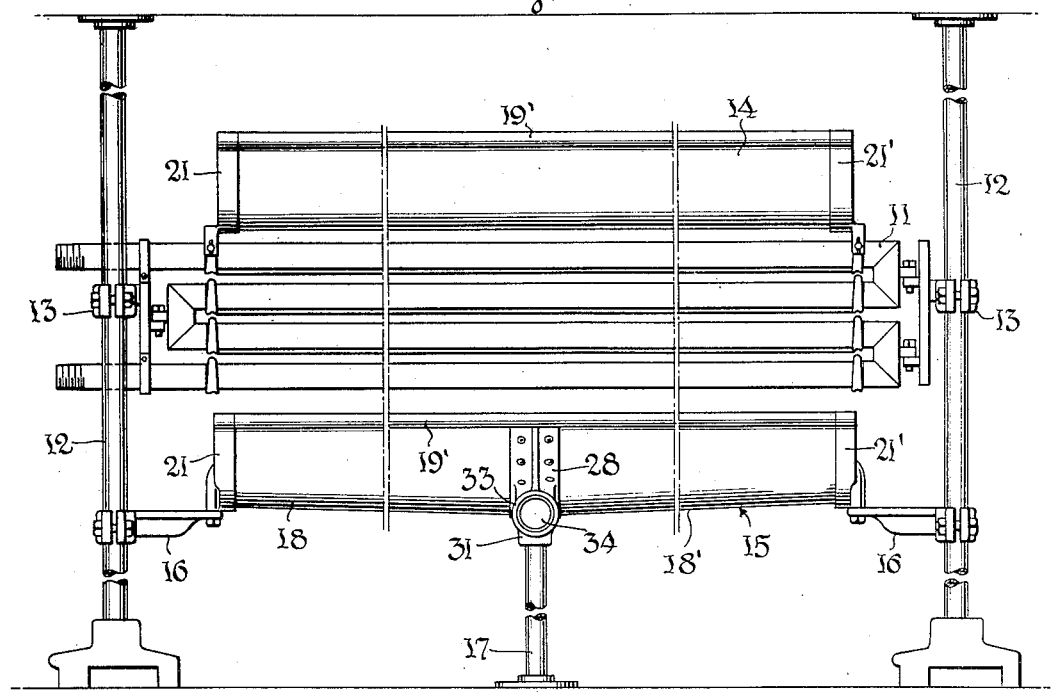
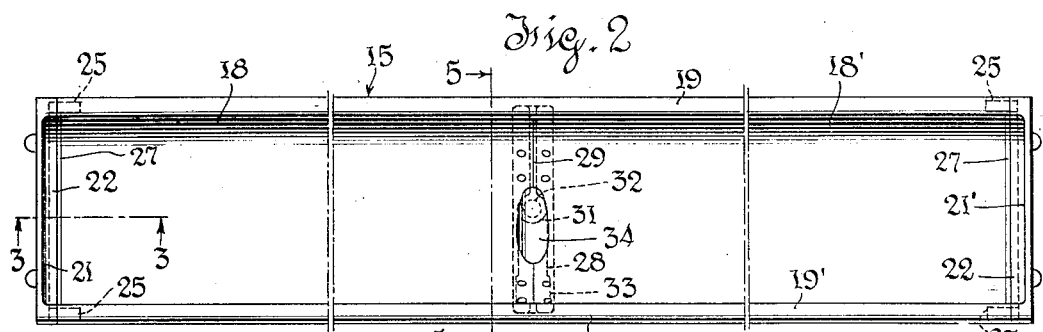
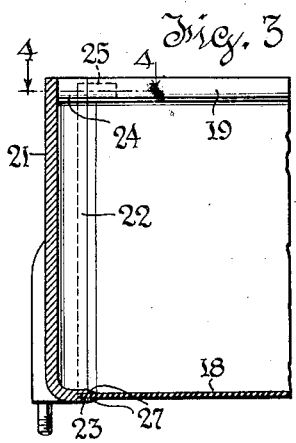
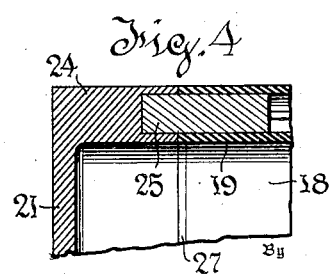
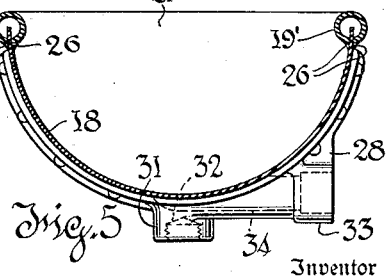
Inventor
Albert T. Light
Dodge and Sons
Attorneys Patented Sept. 12, 1933

1,926,908

UNITED STATES PATENT OFFICE 1,926,908

TROUGH FOR MILK COOLERS

Albert T. Light, Canton, Ohio, assignor to York Ice Machinery Corporation, York, Pa., a corporation of Delaware Application June 16, 1931. Serial No. 544,860

5 Claims. (Cl. 220—1)

The present invention pertains to milk coolers. More specifically the invention relates to the construction of top and bottom troughs disposed respectively above and below the cooling elements.

For obvious reasons it is a prime necessity that equipment employed in diaries and similar establishments be readily washable and that such equipment be so constructed that the accumulation of dirt, rust and foreign material be reduced to a minimum.

It is an object of this invention so to assemble a trough of the type specified that the interior surfaces of the trough be smooth throughout, that soldering be reduced to a minimum and that substantially all of the trough be constructed of corrosion-resisting material.

It is a further object of the invention that the trough sheet be connected to end plates in such a manner that smooth joints will be made.

It is also an object of the invention to provide a combined center support and discharge outlet for the trough.

The following description of the invention and the drawing illustrating a preferred form thereof will enable those familiar with milk coolers clearly to understand the novelty and advantages of the troughs.

In the drawing:—

Fig. 1 is an elevation of a milk cooler having upper and lower troughs, the lower trough having a central support and discharge outlet;

Fig. 2 is a plan view of the lower trough;

Fig. 3 is a sectional view of one end of a trough taken on line 3—3 of Fig. 2;

Fig. 4 is a section view taken on line 4—4 of Fig. 3; and

Fig. 5 is a sectional view taken on line 5—5 of Fig. 2.

In the drawing, the milk cooler comprises one or more coils 11 through which a refrigerant flows and standards 12 on which the coils are supported by means of brackets 13. Disposed above and mounted on the uppermost tube of the cooler is a delivery trough 14. A lower trough 15 is supported on brackets 16 and a centrally disposed standard 17 and is designed to receive milk falling from the cooler. Since in most respects the upper and lower troughs are similarly constructed, only the lower trough will be described, but it is to be understood that those novel features that are common to both troughs are intended to be included in the subject matter claimed herein.

The lower trough 15 comprises a pair of approximately semi-cylindrical trough members 18, 18', arranged end to end, a pair of brass end plates 21, 21' closing the outer ends of the trough sections, and a pair of brass reinforcing tubes 19, 19' mounted on the top edges of the trough sections. The trough sections 18, 18', are made of copper sheets, and the reason for using two sheets in the lower trough 15, is to facilitate formation of the trough with slight inclination of the bottom of the trough from each end toward the middle (see Fig. 1). Where no such inclination is necessary, the trough can be made of a single sheet, as indicated with reference to the upper trough 14 in Fig. 1. Each of the tubes 19, 19' is slotted through its side wall from end to end, the slot serving to receive the alined edges of the two trough sections, as clearly shown in Fig. 5.

The end plates 21, 21' are of approximately semi-circular form, and are each provided with a peripheral flange 22 formed with a slot 23 which is dimensioned to receive the end of a corresponding trough section. The flange 22 extends around the semi-circular contour of the end plate, and at each end is provided with a bulb-shaped enlargement 24 (see Figs. 3 and 4), which is bored to receive a brass dowel 25. The dowels are dimensioned to fit closely into the interior of the tubes 19, 19'.

Before the parts are assembled, they are preferably tinned. When the parts are assembled the upper edges of the trough sections fit into the slots in the tubes 19, 19' and the ends of the trough sections fit in the slots 23 in the flanges of the end plates 21, 21'. The tubes 19, 19' also engage the dowels 25, so that all the parts are positively sustained in properly spaced relation.

When so assembled the joints are soldered and the solder is flowed and smoothed to provide rounded corners and to preclude the existence of any cracks or recesses which can not be readily reached in cleaning.

The abutting ends of sheets 18, 18' are riveted to a combined support and discharge outlet 28 and soldered at 29 also to make a smooth joint where they meet. Support 28 is a yoke-shaped or semi-circular casting to which the trough sheets are riveted and has an integral boss 31 which is provided with a threaded recess 32 into which standard 17 is screwed when the trough is positioned below the milk cooler. The casting is also provided with a horizontal apertured extension 33 forming a discharge passage 34 for milk.

Referring to Fig. 2, it will be seen that sheets 18, 18' are cut to conform with the discharge opening 34 in the casting.

From the foregoing description it will be obvious that a trough is provided which is free from corners and joints thus preventing accumulation of foreign matter and promoting cleanliness. The several parts are made of corrosion-resisting material and are readily soldered to provide leak-proof connections therebetween. The soldered joints and rivets are smooth and inconspicuous, giving a pleasing and sanitary appearance to the troughs. Withal the structure is strong and supported at points subject to the greatest stresses.

While the preferred embodiment has been described in considerable detail, this description is intended to be illustrative rather than limiting, and the inventive principles may be variously embodied.

What is claimed is:—

1. A trough comprising a channel-shaped sheet metal member; a pair of longitudinal reinforcing tubes, each having a slot throughout its length; a pair of end plates, said end plates each having a slot corresponding with the shape of said member and a cylindrical recess at each end of the slot; and a plug fitting into each end of each of said tubes and into one of said recesses, said member being soldered into the slots in said tubes and said end plates.

2. A trough comprising a pair of abutting channel-shaped sheet metal members, said trough having an opening on its underside intermediate the ends thereof; and a yoke-shaped support secured to said members at their abutting ends, said support having a discharge passage therethrough, said passage and opening being in coincident relation.

3. A trough comprising a channel-shaped sheet metal member having an opening on its underside intermediate the ends of the trough; a yoke-shaped support secured to said member, said support having a discharge passage therethrough, said passage and opening being in coincident relation; a supporting standard; and a recessed boss on the underside of said yoke-shaped support, said standard being fitted into said boss.

4. A trough structure comprising in combination end members having channeled flanges conforming to the cross sectional contour of the trough, said flanges having, adjacent the ends of said channels, means for receiving and positioning edge reinforce members for the trough; longitudinally slotted edge reinforce members sustained by the last named means; and a trough element having its end edges received in said slotted flanges and its top edges received in the slots in the edge reinforce members, the clearance in the slots being filled with metal fused in place, and finished to afford smooth surfaces merging into the adjacent surfaces of the connected parts.

5. The combination defined in claim 4 in which the end members are provided with trough supporting means and in which an intermediate portion of the trough is embraced by a supporting yoke having a discharge connection.

ALBERT T. LIGHT.